United States Patent [19]

Tagiri

[11] Patent Number: 5,307,212
[45] Date of Patent: Apr. 26, 1994

[54] TRAPEZOIDAL WAVE GENERATION IN A VIDEO CONTROL SIGNAL WRITE CIRCUIT

[75] Inventor: Hirokazu Tagiri, Kyoto, Japan

[73] Assignee: Rohm Co., Ltd., Kyoto, Japan

[21] Appl. No.: 932,677

[22] Filed: Aug. 20, 1992

[30] Foreign Application Priority Data

Aug. 22, 1991 [JP] Japan .................................. 3-235399
Aug. 22, 1991 [JP] Japan .................................. 3-235400

[51] Int. Cl.$^5$ ........................ G11B 27/02; G11B 5/09
[52] U.S. Cl. ........................................ 360/14.2; 360/46
[58] Field of Search ........................ 360/39, 32, 48, 51, 360/65, 10.2, 70, 77.14, 77.13, 17, 46, 14.2, 78.07, 36.2, 14.3, 10.3; 331/57, 111; 328/178, 185, 187; 307/268, 263, 264

[56] References Cited

U.S. PATENT DOCUMENTS

| | | | |
|---|---|---|---|
| 4,376,268 | 3/1983 | Moriya et al. | 360/32 X |
| 4,392,161 | 5/1983 | Ota et al. | 360/10.3 |
| 4,796,112 | 1/1989 | Mizukami et al. | 360/78.07 |

Primary Examiner—Donald Hajec
Assistant Examiner—Patrick Wamsley
Attorney, Agent, or Firm—Fay, Sharpe, Beall, Fagan, Minnich & McKee

[57] ABSTRACT

A trapezoidal circuit is formed with a D/A converter circuit for receiving the sequentially varying count of a counter and the D/A converter circuit is caused to generate a trapezoidal wave whose slopes on both sides vary linearly. When a control signal is rewritten at the time a leader picking signal is written and erased, the control signal is rewritten upon receipt of the signal linearly varying from the trapezoidal wave generating circuit at the time the write operation is started and terminated.

23 Claims, 4 Drawing Sheets

TRAPEZOIDAL WAVE GENERATION IN A VIDEO CONTROL SIGNAL WRITE CIRCUIT

BACKGROUND OF THE INVENTION

1. Technical Field

The present invention relates generally to the control signal write circuits of a video apparatus, and more particularly, to improvements in a leader picking signal write process, in the control signal write circuits (those which will be described, in this specification, include video apparatuses incorporating cameras, stationary video tape recorders and video apparatus incorporating monitors) having a leader picking function.

2. Background Art

With the recent diffusion of video tape recorders, the function of the video tape recorder is increasingly intensified and diversified. A leader picking function is no exception.

The leader picking function is, such that, certain tag information is stored at each start point of recording (i.e., at the point from which recording is started) on a video tape so that the tape is automatically stopped by detecting the information at the time of fast feeding or rewinding. The leader picking function makes it possible to find out the leading end position of a program at the time of fast feeding and rewinding even when a plurality of broadcasting programs have been recorded thereon.

As leader picking systems, there are presently VISS (VHS Index Search System), VASS (VHS Address Search System) and the like.

In the case of the former system, leader positions are stored in the form of tag information and the tape is stopped at the predetermined position each time the information is read, whereas in the case of the latter, leader positions are stored in the form of predetermined address data, and when an address is designated, the position of the data conforming to the designated address is detected so that the tape is automatically stopped. The control signal written onto the control track of a video tape is generally used to read a leader picking signal or an index signal for obtaining leader picking information or data, or a part of an address signal for determining a stopping position of a video tape (hereinafter referred to as "leader picking signal") when such a leader picking function is practically utilized. The leader picking signal is written or erased by changing the duty ratio of the control signal.

Figure 4:
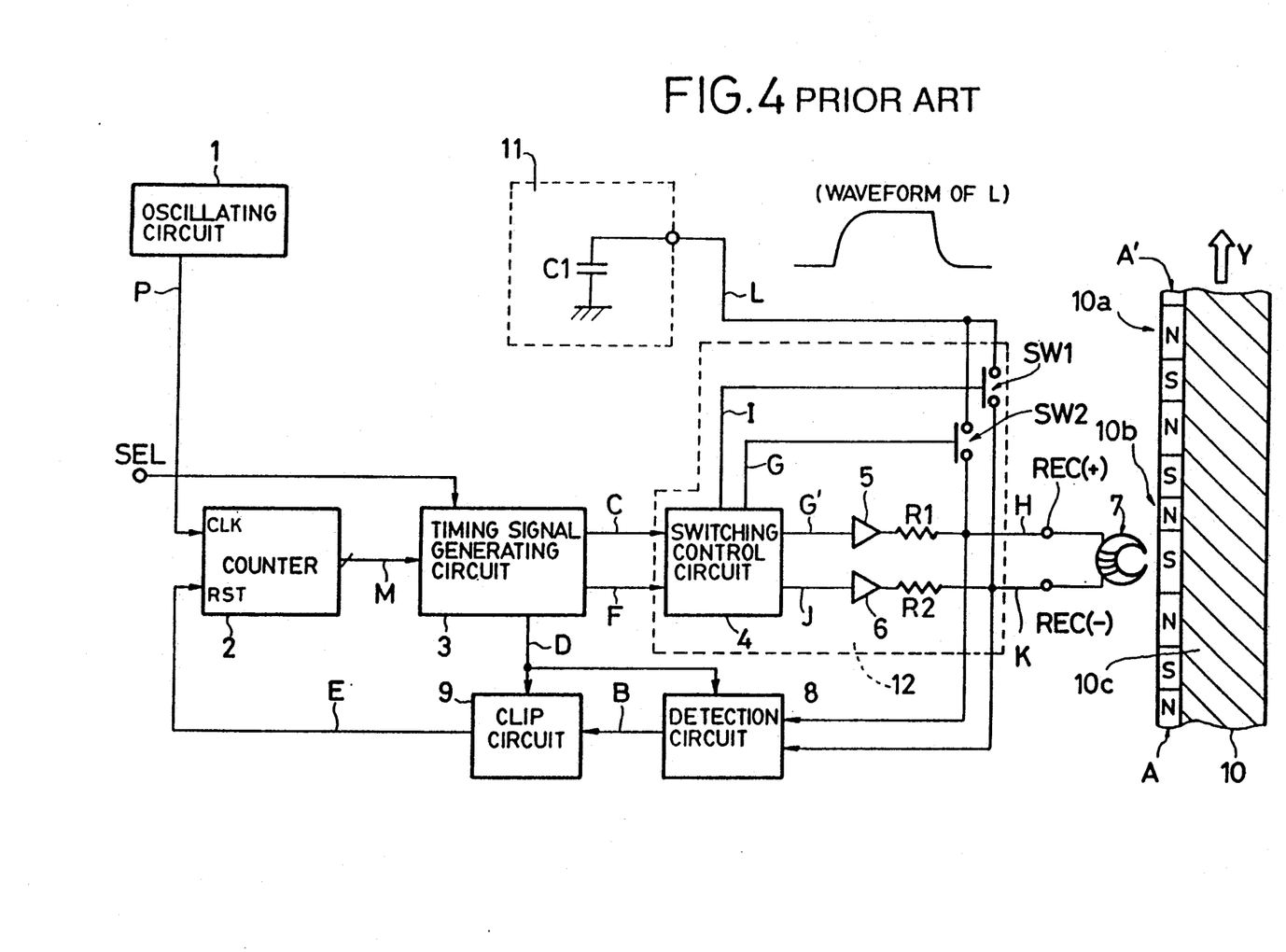
FIG. 4 is a block diagram of a conventional control signal write circuit.

As illustrated in FIG. 4, it is assumed that a video tape 10 is caused to travel in direction of arrow Y at the time of playback. A control track A~A' is provided on one side of the video tape 10. In this case, the side A represents what is to be read and the side A' what has already been read.

A control signal 10a is stored on the control track A~A' and used as a synchronizing signal (timing signal) when a video signal 10c to be stored on the video track are regenerated. In this case, an "ON/OFF" signal having a predetermined duty ratio (i.e., a signal which has been magnetized to the N- and S-polarity on the video tape 10) is normally used for the purpose. With the control signal for use in only specifying a position on the video track, at least the timing position of either a transition point from "ON" to "OFF" or a transition point from "OFF" to "ON" should only be identified. Therefore, there is no problem as long as the transition point is not changed, even when the duty ratio is changed. With this in mind, the leader picking signal is recorded by changing the duty ratio of the control signal.

Of the control signal, the portion used for the synchronizing signal is not directly related to the aforementioned duty ratio and this portion is assumed equivalent to a point where the magnetization is changed from the S- to N-polarity on the video tape 10. This transition point is a point at which the control signal is changed from "OFF" to "ON" when it is read by a control head 7 from the control track, that is, the point is equal in position to the timing of its rise. Consequently, the leader picking signal is written or erased by rewriting the duty ratio of the control signal in such a state that the transition point is rendered unaffected.

Of the control signal, the portion involved in the duty ratio is equivalent to a point where the magnetization is changed from the N- to S-polarity on the video tape 10. Therefore, the leader picking signal to be written or erased is rewritten at this point only. This point at which the control signal is reversely changed from "ON" to "OFF" is equal in position to the timing of the fall of the control signal and has no significance on the part of the control signal itself.

Incidentally, the writing of the control signal, which is dependent on its "ON" or "OFF" state, is based on d.c. recording effected by switching the direction of current from a terminal REC(+) to a terminal REC(−) in the control head or from REC(−) to REC(+) therein. While the control signal is being written, the direction of current is switched at predetermined intervals, whereby the direction of magnetization (i.e., N- and S-polarity) in the magnetic material on the control track A~A' is reversed at predetermined intervals.

In the case of the video tape loaded with images in a normal way, the control signal is in such a state that no leader picking signal has been recorded thereon, that is, a normal control signal whose duty ratio is about 60% as shown by 10a is employed and this signal is written onto the control track A~A'. On the other hand, a control signal whose duty ratio is about 27.5% as shown by 10b is written onto the control track A~A' at a leader picking position where the leader picking signal has been recorded.

When the leader picking signal 10b is written, current for use in writing N-polarity is supplied to the coil of the control head 7 after it has passed the point at which S-polarity of the control signal corresponding to the write position is transferred to its N-polarity (after about 8% in terms of the duty ratio). The direction of current is then changed so that S-polarity is written from a position at a duty ratio of 27.5% and the current is supplied to the coil of the control head 7. Subsequently, control is exercised in such a way that the current flowing through the coil of the control head 7 is suspended before the magnetization is transferred from S- to N-polarity (i.e., before about 10% in terms of the duty ratio).

In order to erase the leader picking signal 10b in such a state that the leader picking signal is read to cause the tape to stop at the position designated thereby, current for use in writing the N-polarity from the rising point of the control signal including the leader picking signal is made to flow through the coil of the control head 7 and the current is switched in such a way that the S-polarity is written from a position at which a duty ratio comes to 60%. This process is actually performed by letting the current for writing the N-polarity flow through the control head 7 after the control head 7 passes the transition point at which the S-polarity is switched to the N-polarity before the position of the leader picking signal 10b (after about 8% in terms of the duty ratio) and letting the current flow through the coil of the control head 7 in the opposite direction from a position where the duty ratio comes to 60% in order to write the S-polarity. Further control is exercised so that the current supplied to the coil of the control head 7 is stopped before the next transition point from the S- to N-polarity is reached (i.e., before about 10% in terms of the duty ratio).

In this way, only the position of the fall portion (the transition point from the N- to S-polarity) of the control signal is changed without changing its rise-up timing (the transition point from the S- to N-polarity) be rewriting to superimposing the control signal. The leader picking signal can thus be written or erased. In the case of the rewriting, the video signal and the like are not rewritten.

The control signal is rewritten as stated above so that the leader picking process is implemented and a part of the control signal is then rewritten. For this reason, there may arise a difference in the degree of magnetization between the control signal already written to the video tape 10 and what is rewritten thereto. Especially when it is attempted to rewrite the control signal so as to write a leader picking signal onto the control signal written by another video tape recorder, there inevitably arises a subtle difference in the degree and position of magnetization.

When such a difference in the degree of magnetization of the control signal ensues at the time of starting of terminating the rewriting, the magnetic flux density varies in that portion different in level when the control signal is read via the control head 7 at the time of playback and the waveform of the signal that has been read accordingly becomes discontinuous. A detection circuit for detecting the rise and fall of the control signal mistakes a transition point where the magnetization ratio varies for leader picking that is, the place where the aforementioned rewriting is started or terminated for the rise or fall timing of the control signal and so malfunctions as to generate a detection signal. The problem is that the image signal may fail to synchronize with the control signal.

In order to solve such a problem, the current flowing through the coil of the control head 7 is gradually increased or decreased when the rewriting of the control signal is started or terminated. As shown in FIG. 4, this process is accomplished by providing a trapezoidal wave generating circuit 11 mainly comprising a capacitor C1 and supplying its output to a drive circuit 12 so as to control current to be passed through the coil of the control head 7 by the operation of a charge/discharge circuit comprising resistors R1, R2 and the capacitor C1. In this way, the rise and fall conditions of the signal for rewriting the control signal to which the leader picking signal is written are made dull (see(L-shaped waveform) of FIG. 4).

Since circuits similar to those illustrated in an embodiment of the present invention in FIG. 1, which will be described later, are used for those other than the aforementioned of FIG. 4, the description of them will be omitted except that like reference characters are given in the embodiment.

In the prior art shown in FIG. 4, the trapezoidal wave generating circuit 11 is complete with one capacitor C1 and switch circuits SW1, SW2 are used to switch charging to discharging and vice versa. If the trapezoidal wave L is formed by using even one capacitor, the capacitor will have to be fitted outside when a control signal write circuit in the form of an integrated circuit (IC) is employed. Moreover, the drooping of the trapezoidal wave L remains irregular as the source voltage and the capacity of a capacitor for use vary. On the other hand, an increase or decrease in current at the time of starting or terminating writing in the case of rewriting has to be caused during the predetermined allowable time. Consequently, the trapezoidal wave L needs a relatively sharp drooping characteristic so that the variation of the write current is completed within a predetermined short period of time. Therefore, the maximum value of the drooping at the time of charging/discharging can not be too small. As a result, the problem of the malfunction of the circuit for detecting the control signal has not satisfactorily been solved yet.

SUMMARY OF THE INVENTION

An object of the present invention is to provide a control signal write circuit for a video apparatus fit for integration and capable of writing and erasing a leader picking signal without using a capacitor.

Another object of the present invention is to provide a control signal write circuit for a video apparatus capable of suppressing a noise component from being generated when a control signal, used to write and erase a leader picking signal is read and of preventing malfunctions on the side of a control signal detection circuit.

Still another object of the present invention is to provide a video apparatus capable of suppressing a noise component from being generated when a control signal, used to write and erase a leader picking signal is read and of preventing malfunctions on the side of a control signal detection circuit.

The control signal write circuit for a video apparatus according to the present invention features the following: a trapezoidal wave generating circuit is formed with a D/A converter circuit for receiving the count of a counter which sequentially varies and the D/A converter circuit is caused to generate a trapezoidal wave whose slopes on both sides linearly change. With respect to the rewriting of the control signal when the leader picking signal is written and erased, the control signal is rewritten on receiving a signal that linearly varies from the trapezoidal wave generating circuit. In other words, a control signal to be superimposed on what has already been written is written in a continuous magnetizing condition in opposition of the magnetizing condition of the original control signal. In this way, the discontinuity of the magnetic characteristics at the connection with the original magnetizing condition is suppressed at the starting and terminating points of superimposition. As a result, the generation of noise with respect to the control signal thus rewritten and read is suppressed and the malfunction of the detection circuit for detecting the rise and fall of the control signal is almost avoided.

The trapezoidal generating circuit receives bits comprising a plurality of low order digits from an external counter and selects these bits directly or those with complements in response to a timing signal. Subsequently, the digital value thus selected is subjected to D/A conversion in the D/A convert circuit and the trapezoidal wave having the predetermined slopes changing linearly is formed by making the obtained waveform a trapezoid, the trapezoidal wave being supplied to a write drive circuit.

On receiving a write timing signal and the aforementioned trapezoidal wave, the write drive circuit controls the intensity and direction of the current which is caused to flow through the coil of a control head according to the signal and further rewrites the control signal to the aforementioned control track while regulating the variation of the current into a predetermined slope when it rises and falls at the time of rewriting.

The reason for the use of part of the bits (normally low order bits) of the count of the counter is to obtain the linear slope so that, in the case of rewriting the bits, the current increase/decrease period when writing is started and terminated comes within the range of allowable time.

In this case, the use of bits just enough in number to have the difference in level due to digitization ignored makes it possible to obtain a linear saw tooth wave exhibiting an ideal rise slope since the slope waveform is formed by the D/A conversion. Moreover, a linear saw tooth wave exhibiting an ideal fall slope is formed by the D/A conversion after the complement of the count is obtained. Therefore, a trapezoidal wave having linear and substantially ideal slopes is formed by obtaining one of the saw tooth waveforms having the rise slope at the starting point of rewriting and one of them having the fall slope at the terminating point of rewriting.

As the write drive circuit controls the intensity and direction of the current directed to the coil of the control head in conformity with the trapezoidal wave, the rewrite current in the coil of the control head varies along a constant slope when it rises and falls. Under such a restriction that the variation of write current should be completed within the predetermined allowable time, the slope in the curvilinear variable portion of the signal can be made less than the maximum slope value in any one of the conventional circuits. Consequently, the changing ratio of magnetization of the connection of the rewritten signal can be kept lower as to the control signal read in the form of the changing ratio of magnetization of the recorded signal.

Moreover, no externally fitted parts are required because capacitors are not used to form the trapezoidal wave and a control signal write circuit fit for integration is attainable.

DESCRIPTION OF THE PREFERRED EMBODIMENTS

Figure 1:
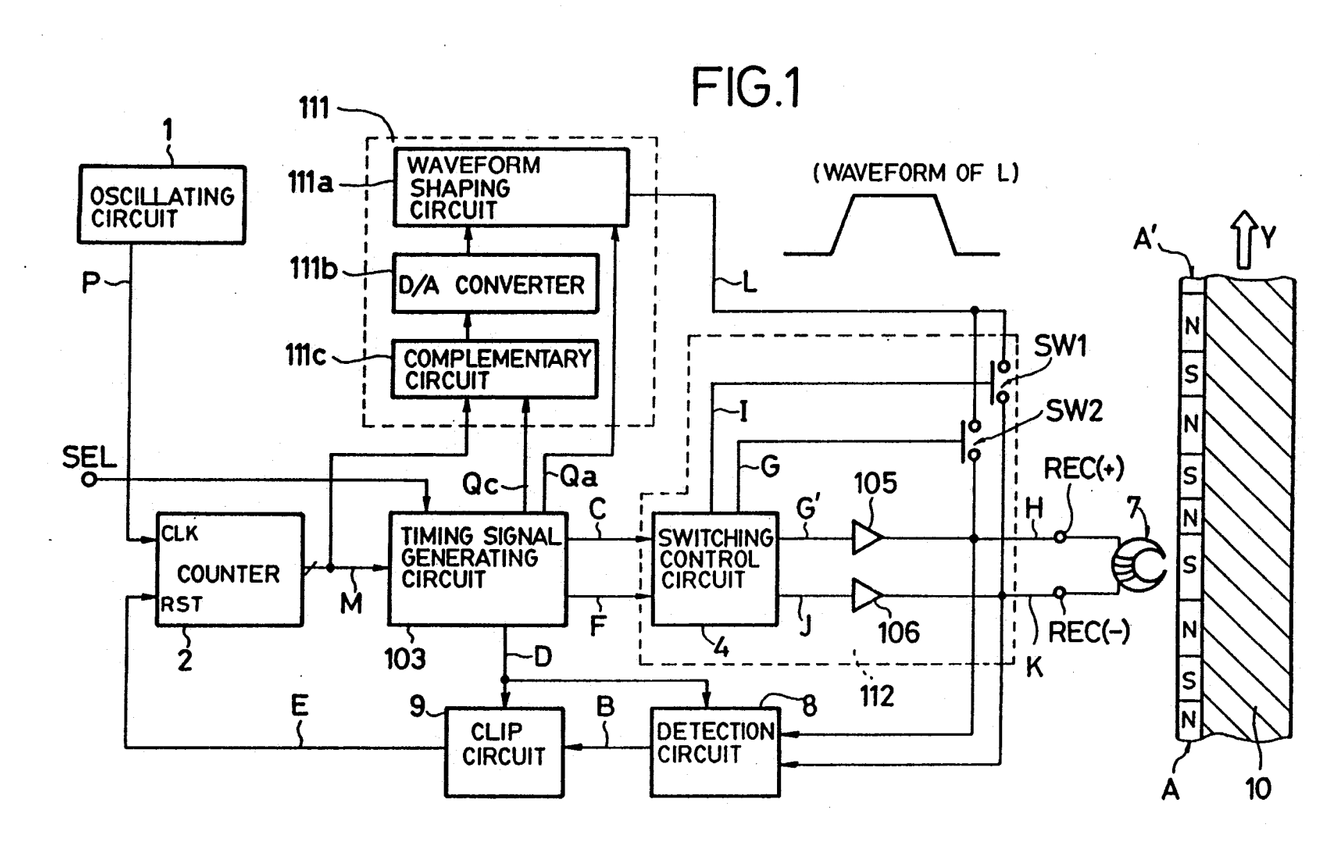
FIG. 1 is a block diagram of a control signal write circuit embodying the present invention.

In FIG. 1, numeral 1 denotes an oscillating circuit for generating a clock signal P and 2 a counter for generating a reference timing signal by counting the clock signal P supplied to a clock terminal (CLK), the counter being initialized when a control signal rises. In this case, the timing at which the control signal rises is determined by the application of a rise timing signal E, which will be described later, to a reset terminal (RST). The counter 2 outputs a preset count M as the reference timing signal. This circuit is similar to what is shown in FIG. 4. The count M corresponds to a time interval from control signal rise time until rewriting is started at the time of rewriting; in other words, it is a count for giving a position backward by about 8% in terms of a duty ratio from the S-to-N polarity transition point on a magnetic tape 10.

Numeral 103 denotes a timing signal generating circuit for generating a write signal C, a gate signal F indicating a write range at the time of rewriting, a read control signal D, and timing signals Qa, Qc for generating a trapezoidal wave from the count M.

Like the timing signal generating circuit 3 of FIG. 4, the circuit 103 generates the write signal C, the gate signal F and the read control signal D but differs from what is shown in FIG. 4 in that the latter generates the timing signals Qa, Qc for designating the timing at which the slopes of the trapezoidal wave are formed.

Numeral 112 denotes a write drive circuit for controlling the intensity and direction of current made to flow through the coil of a control head 7 via signals H, K. Although this circuit 112 corresponds to the write drive circuit 12 of FIG. 4, it differs from what is shown in FIG. 4 in that the former is provided with drivers 105, 106 in place of the driver 5, the resistor R1, the driver 6 and the resistor R2. A switching control circuit 4 provided in this circuit is similar to what is shown in FIG. 4. In order to make the component parts shown in FIG. 1 contrast with those in FIG. 4, there are provided switch circuits SW1, SW2 and the drivers 105, 106 with amplifier symbols. However, as will be described later, the operation of these circuits is different from that of those shown in FIG. 4. In other words, a combination of the switch circuit SW1 and the driver 106, and that of the switch circuit SW2 and the driver circuit 105 perform the switching operation, wherein when one is held "ON", the other is held "OFF". Actually, push-pull transistor circuits may, and usually do, replace those in FIG. 1.

Numeral 7 denotes the aforementioned control head for writing and reading the control signal stored on the control track of a video tape as a direction of magnetization, 8 a detection circuit for detecting a transition point from the control signal that has been read and outputting the signal B thus detected, 9 a clip circuit for extracting only the rise component from the detection signal B and applying the rise timing signal E to the reset terminal (RST) of the counter 2 and other circuits which need synchronization at a predetermined level, 10 the aforementioned video tape which travels in direction of Y at the time of playback. These circuits are those shown in FIG. 4. Numeral 111 denotes a trapezoidal wave generating circuit for generating a trapezoidal wave L (current waveform) of FIG. 1 on receiving the count of the counter 2. Although this circuit 111 corresponds to the trapezoidal wave generating circuit 11 of FIG. 4, it differs from the latter in not only its circuit arrangement but also the trapezoidal waveform to be generated. This trapezoidal wave generating circuit 111 comprises a waveform shaping circuit 111a, a D/A converter 111b and a complementary circuit 111c.

The complementary circuit 111c generates low order bit complements less than the count M. On receiving a timing signal Qc, the complementary circuit 111c selects either the direct value of the low order bit less than the count M or the complement thus generated at that timing and supplies either of them to the D/A converter 111b. On receiving a digital value from the complementary circuit 111c, the D/A converter 111b subjects the value to D/A conversion and supplies a saw tooth wave to the waveform shaping circuit 111a. On receiving the saw tooth wave output from the D/A converter 111b, the waveform shaping circuit 111a forms the trapezoidal wave L having slopes at the timing indicated by the timing signal Qc. More specifically, low order digit values less than M of the counter 2 from "0" up to "M" are sequentially counted in response to the clock signal P and the circulating count is supplied from the counter 2 to the complementary circuit 111c. On receiving the timing signal Qc, the complementary circuit 111c sequentially supplies the counts from "0" up to "M" to the D/A converter 111b. The D/A converter 111b subjects the digital value received to D/A conversion directly and sequentially, forms a waveform of the rise slope of the trapezoidal wave and supplies the waveform to the waveform shaping circuit 111a. On receiving a timing signal Qa, the waveform shaping circuit 111a sends out the output of the D/A converter 111b. As a result, the trapezoidal wave L having an analog value is formed as shown in FIG. 1. In this case, a constant current value after the slope of the trapezoidal wave is equal to the current predetermined as a write current value.

In order to effect the control set forth above, the timing signal generating circuit 103 initially receives the count M from the counter 2 and generates the timing signals Qa, Qc and the timing when the current of the slope of the trapezoidal wave is equal to a write current value. Further, the timing signal generating circuit 103 initially receives the count M from the counter 2, generates the timing signals Qa, Qc at predetermined timing prior to a point of time rewriting is terminated. The timing signals Qa, Qc are supplied to the complementary circuit 111c and the waveform shaping circuit 111a. The complementary circuit 111c sequentially generates complements from "0" to "−M" against the count received from the counter when it receives the second timing signal Qc and supplies them to the D/A converter 111b. Then the fall slope that has been subjected to D/A conversion is supplied to the waveform shaping circuit 111a. The waveform shaping circuit 111a receives the timing signal Qa and sends out the output of the D/A converter 111b. As a result, the trapezoidal wave referred to as L in FIG. 1 is output. In this case, a signal SEL for selecting a duty ratio has been applied to the timing signal generating circuit 103. Either a duty ratio of 60% or 27.5% is selected in response to the signal SEL and the write current is switched at one of the duty ratios. Consequently, a leader picking signal is written when a duty ratio of 27.5% is selected, whereas the signal is erased when a duty ratio of 60% is selected.

In the case of the trapezoidal wave generating circuit 111 above, it may be so arranged that the trapezoidal wave of digital value is generated by causing the waveform shaping circuit 111a to receive directly the output of the complementary circuit 111c in order to rectify the output and then the trapezoidal wave L of analog value is generated by causing the D/A converter 111b to subject the trapezoidal wave of digital value to D/A conversion.

The write drive circuit 112 is used to control the current directed to the coil of the control head 7. On receiving the gate signal F and the write signal C from the timing signal generating circuit 103, the write drive circuit 112 supplies current corresponding to the write signal C to the coil of the control head 7 when the gate signal F is in the "OFF" state.

The output line of a signal H from the driver 105 of the write drive circuit 112 is connected to one end of the coil of the control head 7 via REC (+) terminal, whereas the output line of a signal K from the driver 106 of the write drive circuit 112 is connected to the other end of the coil of the control head 7 via REC (−) terminal. Further, the write drive circuit 112 switches the output level of the signal H or K in conformity with the HIGH level (hereinafter referred to "H") or LOW level ("L") of the write signal. The direction of the d.c. current among the REC (+) terminal, the coil of the control head 7 and the REC (−) is thereby switched.

Since the direction of the current flowing through the coil of the control head 7 is inverted in conformity with "H" or "L" of the write signal C in this way, the control signal whose direction of magnetization is alternately inverted is stored on a control track A∼A' confronting the control head 7.

The switch circuit SW2 is connected to the line of the signal H and the switch circuit SW1 to that of the signal K in the write drive circuit. The other ends of these switch circuits SW1, SW2 are connected to the output line of the trapezoidal wave generating circuit 111 so as to receive the trapezoidal wave L. While the switch circuit SW1 is receiving a switching signal I from the switching control circuit 4, it applies the trapezoidal signal L to the REC (−) terminal as the signal K. At this time, the switch circuit SW2 is in the "OFF" state and the output state of the driver 106 remains at high impedance according to a control signal K so as not to disturb the signal J. On the other hand, the driver 105 switches the signal H to "L" according to a control signal G'. When the driver 105 is used as a switch circuit forming a pair with the switch circuit SW2, it is turned on and outputs "L" when the switch circuit SW2 is turned off, whereby the d.c. current flows from the REC(−) terminal via the coil of the control head 7 toward the rec(+) terminal.

When the switch circuit SW2 has received a switch signal G, conversely, it applies the trapezoidal wave L to the REC(+) terminal as the signal H. At this time, the switch circuit SW1 is in the "OFF" state and the output state of the driver 105 remains at high impedance according to the signal G' so as not to disturb the signal H. Further, the driver 106 switches the signal K to "L" according to the signal J. When the driver 106 is used as a switch circuit forming a pair with the switch circuit SW1, it is turned on and outputs "L" when the switch circuit SW2 is turned off, whereby the d.c. current flows from the REC(+) terminal via the coil of the control head 7 toward the REC(−) terminal.

Referring to a waveform chart of FIG. 2, a detailed description will be given of the rewrite operation of the control signal in such a control signal write circuit. In order to make it simple to relate signals to exemplified waveforms, corresponding signals are used to relate each signal in FIG. 1 to each waveform in FIG. 2.

A waveform (A) (magnetized state A) refers to the state of the control signal presently written to the control track A. This is necessary for a place where a square wave rises (transition point from S- to N-polarity) to be synchronized with a video signal or the like. The duty ratio of the control signal is shown by a place where it falls (transition point from N- to S-polarity) and whether or not it is a leader picking signal is clarified.

Figure 2:
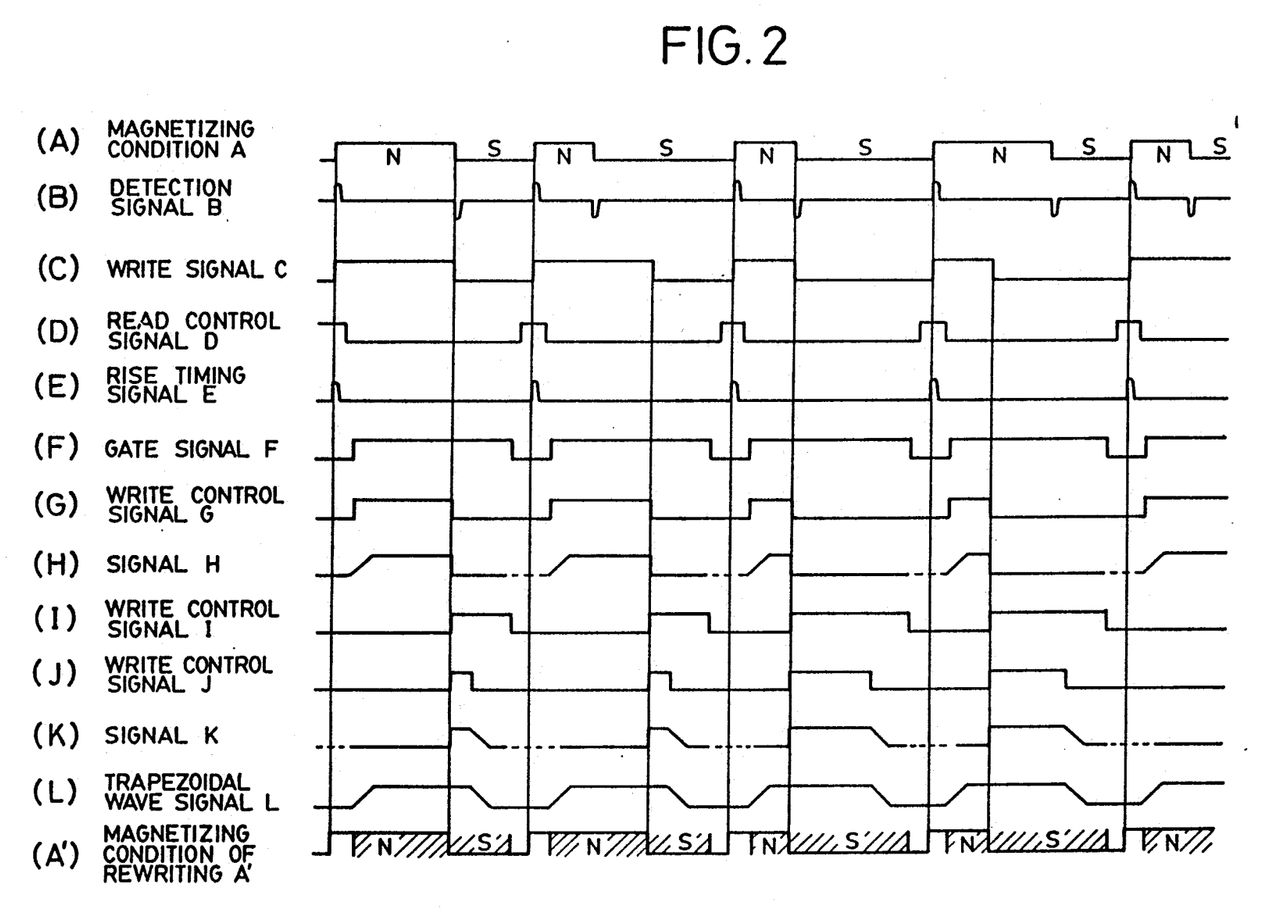
FIG. 2 is a waveform chart of signals in various circuits of FIG. 1.

In an example of FIG. 2, the first and fourth control signals are normal signals, whereas the second, third and fifth control signals are leader picking signals.

Although leader picking signals and normal signals have been shown for convenience of illustration in FIG. 2, one leader picking operation is performed by using several tens of continuous leader picking signals.

A waveform (B) refers to an example of the detection signal B output by a detection circuit 8 when the control signal (equivalent to a waveform A) on the control track A is directly read by the control head 7. The turning point of the magnetization of the control signal is detected by this signal B. Consequently, the difference in duty ratio is detected and the presence or absence of the leader picking signal is also detected.

A waveform (C) refers to an example of the write signal C when the leader picking signal is rewritten. The write drive circuit 112 rewrites the control signal to the control track A according to the write signal C. In other words, this rewrite signal C is equivalent to the control signal (at the lowermost side A') on the control track A—A after rewriting.

A waveform (D) refers to an example of the read control signal D for controlling the "ON/OFF" state of the input of the read signal to the detection circuit 8 for playback and the clip circuit 9. When this signal D is in the "ON" state, the coil of the control head 7 acts as a read coil and the detection signal B is output from the detection circuit 8. The rise timing signal E is generated by the clip circuit 9 from the signal B and the signal D, the signal E being clipped at a predetermined level in such a relation that it is utilized in synchronization with the video signal. Further, the signal E is used as a synchronizing signal for initializing various circuits and the counter 2 in the video signal system. A waveform (E) pertains to the signal E and in this example, this means its "ON" state is kept between −10% and +10% with respect to one period as it is only needed to detect the rise of the control signal.

Further, a waveform (F) refers to an example of the gate signal F for controlling the operation of the write drive circuit 112 and the signal F is turned on after the passage of predetermined time after the signal E rises and keeps the "ON" state for a predetermined time interval. While the gate signal F is in the "ON" state, the control head 7 is in the write mode. The gate signal F and the signal D respectively for writing and reading purposes are set so that their "ON" states are not superimposed. Moreover, the point of time the gate signal F is turned on has to precede the fall of the control signal meaning leader picking, whereas the point of time the gate signal F is turned off has to follow the fall of the ordinary control signal. Under the conditions thus met, whatever control signal initially stored it may be, it is rewritable to the rewrite signal (see waveforms C, at side A'). In this example, the "ON" state of the gate signal F is kept between 15% and 85% of one period with the rise of the control signal E as a reference.

In this case, the d.c. current is cause to flow in the directions of the REC(+) terminal, the coil of the control head 7 and the REC(−) terminal as long as the gate signal F and the write signal C are in the "ON" state. As the write control signal G varying like a waveform (G) causes the trapezoidal wave L to be supplied via the switch circuit SW2, the voltage at the REC(+) terminal varies in such a way as to gradually rise at a predetermined slope like a waveform H.

When the write signal C is turned off, the d.c. current flows from the RED(−) terminal via the coil of the control head 7 toward the RED(+) terminal. At this time, the trapezoidal waveform L is supplied according to the signal I varying like a waveform (I) via the switch circuit SW1, whereby the voltage at the REC(−) terminal varies in such a way as to fall gradually at a predetermined slope like a waveform (K).

The waveforms (H), (K) refer to the signals H, K and the portions indicated by a broken line show read timing. In order not to disturb the read signal at that time, the switch circuits SW1, SW2, the drivers 105, 106 are set in a high impedance state and the contents stored on the control track A~A' are not rewritten.

As a result, only a portion corresponding to the hatching of the waveform (A') on the control track A' is rewritten. On receiving the detection signal B, for instance, the leader picking detection signal is then allowed to detect the presence or absence of the leader picking signal in accordance with the timing of generation of the signal.

Since the timing signal generating circuit 103 generates the write signal C, the gate signal F and the read control signal D, the timing signals Qa, Qc for generating the trapezoidal signal and other signals I, G, G', J can readily be generated by a counter, a delay circuit, a logic circuit and the like as long as their waveforms are made known, and a detailed description of them will be omitted.

Figure 3:
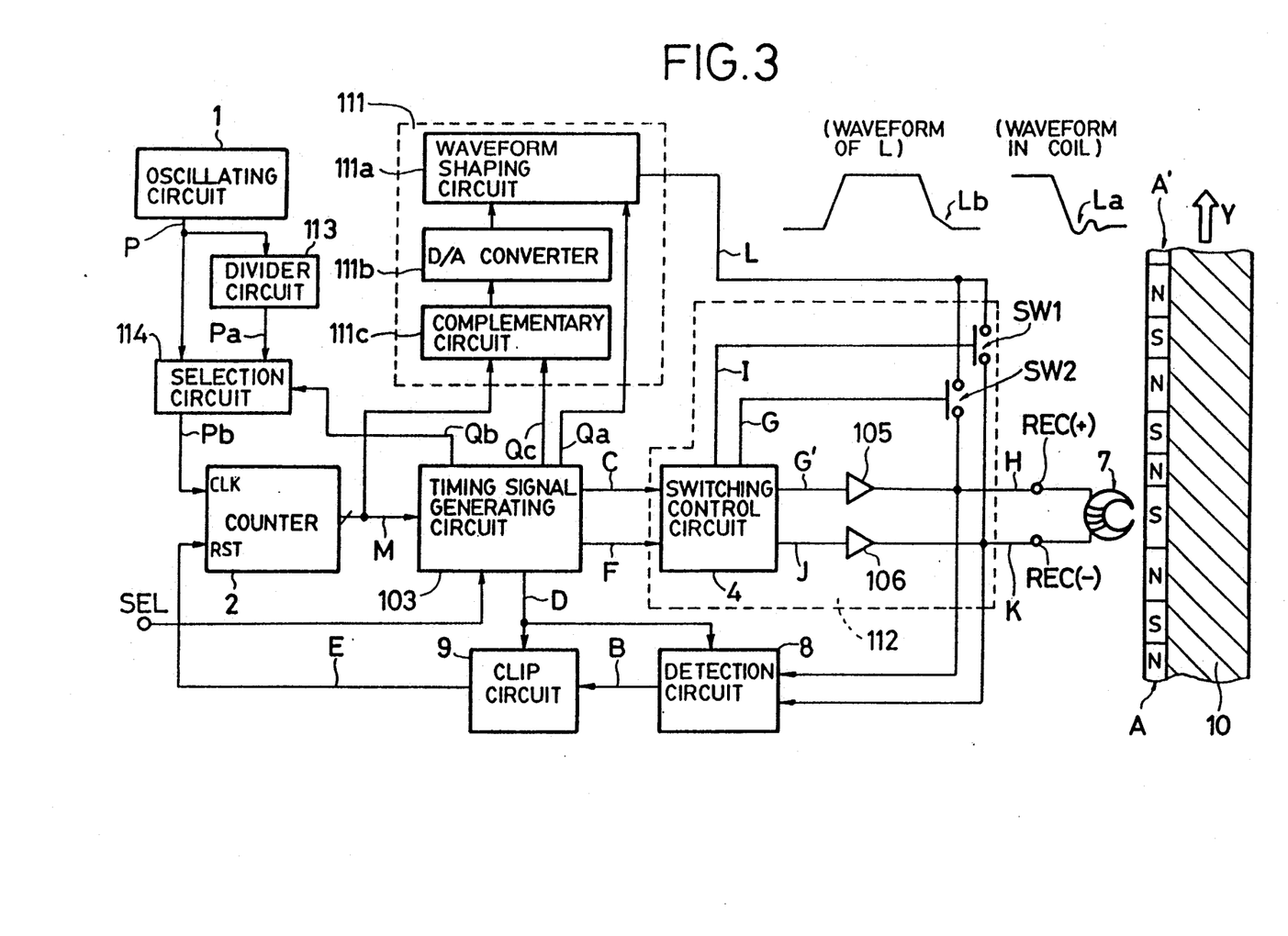
FIG. 3 is a block diagram of another control signal write circuit embodying the present invention.

FIG. 3 illustrates another embodiment. The difference between this embodiment and what is shown in FIG. 1 lies in the fact that there are provided a divider circuit 113 for dividing the clock signal P and a selection circuit 114 for selecting either the clock signal P or a clock signal Pa resulting from the division made by the divider circuit 113, the divider circuit 113 and the selection circuit 114 being provided between the oscillating circuit 1 and the counter 2. Either clock signal, which is defined as a clock signal Pb in this case, is sent out to the counter 2. By switching the frequency of the clock signal Pb, part Lb of the latter half of the fall slope at the trailing edge of the trapezoidal wave L shown in the form of the waveform L is bent into a gently-sloping straight line. The overshooting portion La generated by the coil component of the control head 7 shown as the "waveform in coil" is suppressed and noise is simultaneously reduced further when the control signal thus rewritten is read.

Since the selection circuit 114 is normally caused to select the clock signal P, the entire circuit normally operates in a manner similar to what is shown in FIG. 1. As shown in FIG. 3, the timing signal generating circuit 103 generates a clock switching signal Qb at the timing of starting the latter half portion Lb of the fall slope at the trailing edge of the trapezoidal wave L, whereby the frequency of the clock signal Pb lowers, thus making the variation of the count received by the complementary circuit 111c that produces a gently-sloping straight line. As a result, the trapezoidal wave L shown in FIG. 3 is obtained. The variation of magnetization until the current for use in rewriting the control signal is stopped becomes gently sloped, thus preventing the overshooting portion from being produced.

As set forth above, the control signal write circuit in this embodiment allows the current flowing through the coil of the control head 7 at the time of rewriting to rise and fall gradually at a gentle slope. Therefore, there develop no great peaks in the various signals resulting from reading the control signal as the originally written control signal and the rewritten signal, though there is a slight difference in magnetization therebetween, because difference is made to vary gradually. Consequently, noise in the rewritten control signal can be reduced by a large margin.

Although the description given above has centered on the rewriting of the control signal, it is only necessary to make the timing signal generating circuit generate "ON", "OFF" signals at a duty ratio of 60% at the control head when the control signal is written. With respect to this technique, the "ON", "OFF" signals are caused to be generated by applying the control signal directly to the timing signal generating circuit 3 from the outside or controlling RST of the counter 2 as in the prior art. However, the description of this technique will be omitted as it is easy to generate such signals, which is well known in the prior art.

However, the normal duty ratio of the control signal is not limited to 60%, nor is the duty ratio at the time of writing the leader picking signal limited to 27.5%. When the method of initially increasing the control signal writing current at the time of rewriting and decreasing at the time of termination, the normal duty ratio may range from 45% up to about 75% and it may also range from 15% up to about 35% at the time the leader picking signal is written.

Although the trapezoidal wave has a current waveform in the embodiment shown, it may be in the form of a voltage waveform for exerting control in such a way as to let a linear slope current flow through the coil of the control head.

While a preferred embodiment has been set forth with specific details, further embodiments, modifications and variations are contemplated according to the broader aspects of the present invention, all as determined by the spirit and scope of the following claims.

What is claimed is:

1. A control signal write circuit of a video apparatus wherein the duty ratio of a control signal that has been written by a control head having a coil onto a control track of a video tape is rewritten, said control signal write circuit comprising:
    a counter for starting counting clock signals in response to the control signal read by said control head and outputting a count,
    a trapezoidal wave generating circuit for generating a trapezoidal wave having linear slopes on both sides, and for sequentially subjecting the count of said counter to D/A conversion to form the trapezoidal wave, and
    a write drive circuit receiving a timing signal for rewriting said control signal and said trapezoidal wave for gradually increasing a write current caused to flow through the coil of said control head in accordance with one waveform on one of the linear slopes and thereby raising the write current up to a predetermined current value effective for rewriting, and stopping the write current by gradually decreasing the write current in accordance with the other waveform on the other of the linear slopes.

2. A control signal write circuit of a video apparatus as claimed in claim 1, further including
    a timing gate signal generating circuit for generating the timing signal for rewriting said control signal with a rise at a predetermined period of time later than an edge of the signal obtained by reading said control signal from said control track, and with a fall during a period on before the same edge of the following signal obtained by reading said control signal.

3. A control signal write circuit of a video apparatus as claimed in claim 2, wherein said write drive circuit and said timing gate signal generating circuit control a duty ratio of said control signal to which said leader picking signal has not yet been written within the range of 45% to 75%, and the duty ratio of said control signal to which the leader picking signal has been written is within the range of 15% to 35%.

4. A control signal write circuit of a video apparatus as claimed in claim 2, wherein said write drive circuit and said timing gate signal generating circuit control the duty ratio to which said control signal is rewritten within the range of 45% to 75% for erasing the leader picking signal.

5. A control signal write circuit of a video apparatus as claimed in claim 1, wherein the write current has HIGH and LOW levels alternately repeated, wherein said trapezoidal wave has a current waveform, and wherein said write drive circuit gradually increases the write current from a point of time the rewriting is started in accordance with the forward slope of the trapezoidal wave, magnetizes said control track by raising the write current up to the predetermined current value, reversely magnetizes said control track by inverting the direction of the write current with a duty ratio at said time of rewriting, and gradually decreases the write current thus inverted from a point of time writing is terminated in accordance with the backward slope of the trapezoidal wave.

6. A control signal write circuit of a video apparatus as claimed in claim 5, wherein the backward slope of said trapezoidal wave is bent midway to form a more gently sloped straight line.

7. A control signal write circuit of a video apparatus as claimed in claim 5, wherein a leader picking signal is written when said control signal is written to said video tape in such a way that the fall position of said control signal is determined by the duty ratio for the leader picking signal, and wherein said counter and said trapezoidal wave generating circuit are formed into integrated circuits.

8. A control write circuit of a video apparatus as claimed in claim 7, wherein said leader picking signal is an index signal for stopping a position of said video tape.

9. A control write circuit of a video apparatus as claimed in claim 7, wherein said leader picking signal is an address signal for controlling stopping at a position of said video tape.

10. A control write circuit of a video apparatus as claimed in claim 7, further including
    a timing gate signal generating circuit for generating the timing signal for rewriting said control signal with a rise at a predetermined period of time later than an edge of the signal obtained by reading said control signal from said control track, and with a fall during a period on before the same edge of the following signal obtained by reading said control signal.

11. A control signal write circuit of a video apparatus as claimed in claim 10, wherein said trapezoidal wave generating circuit includes a complementary circuit for forming a sawtooth waveform from the count output from said counter, a D/A converter inputting the sawtooth waveform, and a waveform shaping circuit inputting the output of said D/A converter and outputting the trapezoidal wave in a waveform having a linear rise as the one of the linear slopes, a constant current as the predetermined current value and a linear fall as the other of the linear slopes.

12. A control signal write circuit of a video apparatus as claimed in claim 11, further including means for selectively changing the count of said counter during the fall of the trapezoidal wave to bend the trapezoidal wave to obtain a more gently sloped straight line fall at the end of the fall.

13. A control signal write circuit of a video apparatus as claimed in claim 12, wherein said timing gate signal generating circuit generates the switching signal.

14. A control signal write circuit of a video apparatus as claimed in claim 12, wherein said means includes an oscillating circuit for generating a normal clock, a divider circuit for dividing the normal clock to produce a divided clock, a selector circuit for selecting one of the normal clock and the divided clock as input clock signals to said counter.

15. A control signal write circuit of a video apparatus as claimed in claim 14, wherein said timing gate signal generating circuit generates the switching signal.

16. A control signal write circuit of a video apparatus wherein the duty ratio of a control signal that has been written by a control head having a coil onto a control track of a video tape is rewritten, said control signal write circuit comprising:
an integrated trapezoidal wave generating circuit for generating a trapezoidal wave having a linear rise, a constant current effective for rewriting, and a linear fall in response to a digital input and a timing signal;
a timing signal generating circuit for generating the timing signal from a signal derived from reading the control signal and a signal derived from a clock;
a write drive circuit receiving the timing signal from said timing signal generating circuit, receiving the trapezoidal wave from said trapezoidal wave generating circuit and in response thereto supplying a write current to the coil of said control head for rewriting the control signal with the write current being supplied so that the rise is delayed for a fixed period of time from the timing of a rise or fall of the signal derived from reading the control signal; and
further including a selector for selectively changing the digital input during the fall of the trapezoidal wave to bend the trapezoidal wave to obtain a more gently sloped straight line fall at the end of the fall.

17. A control signal write circuit of a video apparatus as claimed in claim 16, further including: a counter for outputting the digital input;
an oscillating circuit for generating a normal clock;
a divider circuit for dividing the normal clock to produce a divided clock; and
said selector selecting one of the normal clock and the divided clock as input clock signals to said counter in response to a switching signal.

18. A control signal write circuit of a video apparatus as claimed in claim 17, further including a timing gate signal generating circuit that generates the switching signal.

19. A video apparatus wherein the duty ratio of a control signal that has been written by a control head having a coil onto a control track of a video tape is rewritten, said video apparatus comprising:
a counter for starting counting clock signals in response to the control signal read by said control head and outputting a count,
a trapezoidal wave generating circuit for generating a trapezoidal wave having linear slopes on both sides, and for sequentially subjecting the count of said counter to D/A conversion to form the trapezoidal wave, and
a write drive circuit receiving a timing signal for rewriting said control signal and said trapezoidal wave for gradually increasing a write current caused to flow through the coil of said control head in accordance with one waveform on one of the linear slopes and thereby raising the write current up to a predetermined current value effective for rewriting, and stopping the write current by gradually decreasing the write current in accordance with the other waveform on the other of the linear slopes.

20. A control write circuit of a video apparatus as claimed in claim 19, wherein a leader picking signal is written when said control signal is written to said video tape in such a way that the fall position of said control signal is determined by the duty ratio for the leader picking signal, and wherein said counter and said trapezoidal wave generating circuit are formed into integrated circuits.

21. A control signal write circuit of a video apparatus wherein the duty ratio of a control signal that has been written by a control head onto a control track of a video tape is rewritten, said control signal write circuit comprising:
a counter for starting counting clock signals in response to the control signal read by said control head,
a trapezoidal wave generating circuit for generating a trapezoidal wave having slopes on both sides, said slopes linearly varying being obtained by sequentially subjecting the count of said counter to D/A conversion, and
a write drive circuit receiving a timing signal for rewriting said control signal and said trapezoidal wave at the time of rewriting, gradually increasing a write current caused to flow through the coil of said control head in accordance with one waveform on one of the slope sides, raising the write current up to a predetermined current value the delivery of the current directed to said coil by gradually decreasing the current in accordance with the other waveform on one of the slope sides;
wherein the signal written as said control signal is such that its HIGH and LOW levels are alternately repeated, wherein said trapezoidal wave has a current waveform, and wherein said write drive circuit gradually increases the current caused to flow through the coil of said control head from the point of time the rewriting is started in accordance with the forward slope out of both slopes, magnetizes said control track by raising the write current up to a predetermined current value, reversely magnetizes said control track by inverting the direction of the predetermined current in conformity with the duty ratio at said time of rewriting, and gradually decreases the current thus inverted from this side of the point of time writing is terminated in accordance with the backward slope out of both slopes;

wherein the backward slope of said trapezoidal wave is bent midway to form a more gently sloped straight line;

wherein said gentle linear slope is attained by lowering the frequency of said clock signal.

22. A control signal write circuit of a video apparatus wherein the duty ratio of a control signal that has been written by a control head onto a control track of a video tape is rewritten, said control signal write circuit comprising:

a counter for starting counting clock signals in response to the control signal read by said control head, a trapezoidal wave generating circuit for generating a trapezoidal wave having slopes on both sides, said slopes linearly varying being obtained by sequentially subjecting the count of said counter to D/A conversion, and a write drive circuit receiving a timing signal for rewriting said control signal and said trapezoidal wave at the time of rewriting, gradually increasing a write current caused to flow through the coil of said control head in accordance with one waveform on one of the slope sides, raising the write current up to a predetermined current value the delivery of the current directed to said coil by gradually decreasing the current in accordance with the other waveform on one of the slope sides;

wherein the signal written as said control signal is such that its HIGh and LOW levels are alternately repeated, wherein said trapezoidal wave has a current waveform, and wherein said write drive circuit gradually increases the current caused to flow through the coil of said control head from the point of time the rewriting is started in accordance with the forward slope out of both slopes, magnetizes said control track by raising the write current up to a predetermined current value, reversely magnetizes said control track by inverting the direction of the predetermined current in conformity with the duty ratio at said time of rewriting, and gradually decreases the current thus inverted from this side of the point of time writing is terminated in accordance with the backward slope out of both slopes;

wherein the backward slope of said trapezoidal wave is bent midway to form a more gently sloped straight line;

a clock generating circuit for generating said clock signal, a divider circuit for dividing said clock signal on receiving said clock signal and a selection circuit for selecting either said clock signal or the divided clock signals, and wherein said more gently sloped straight line is attained from the selected one of the clock signals that has been selected by said selection circuit.

23. A control signal write circuit of a video apparatus wherein the duty ratio of a control signal that has been written by a control head having a coil onto a control track of a video tape is rewritten, said control signal write circuit comprising:

an integrated trapezoidal wave generating circuit for generating a trapezoidal wave having a linear rise, a constant current effective for rewriting, and a linear fall in response to a digital input and a timing signal;

a timing signal generating circuit for generating the timing signal from a signal derived from reading the control signal and a signal derived from a clock; and a write drive circuit receiving the timing signal from said timing signal generating circuit, receiving the trapezoidal wave from said integrated trapezoidal wave generating circuit and in response thereto supplying a write current to the coil of said control head for rewriting the control signal with the write current being supplied so that the rise is delayed for a fixed period of time from the timing of a rise or fall of the signal derived from reading the control signal.

* * * * *